A. J. HALL.
SYSTEM OF CONTROL.
APPLICATION FILED JAN. 10, 1916.

1,278,143.

Patented Sept. 10, 1918.
4 SHEETS—SHEET 3.

WITNESSES:
R. J. Fitzgerald
W. R. Coley

INVENTOR
Arthur J. Hall.
BY
Wesley G. Carr
ATTORNEY

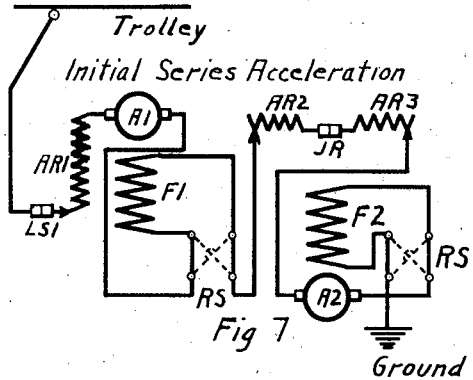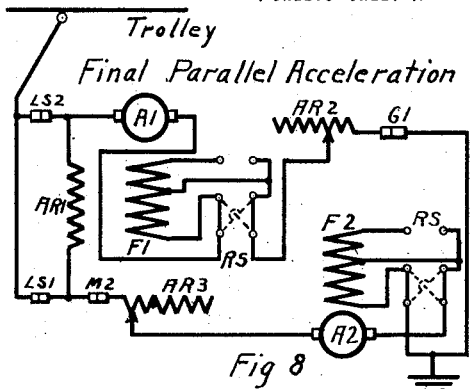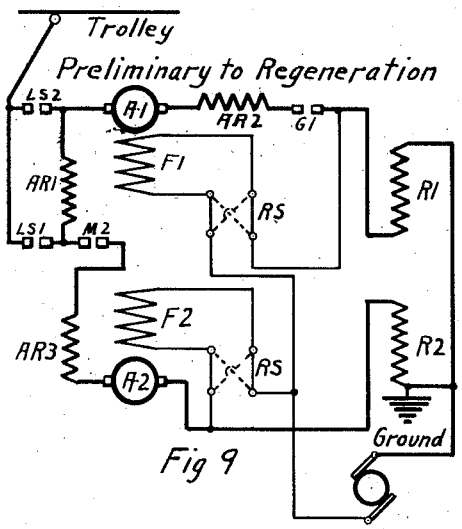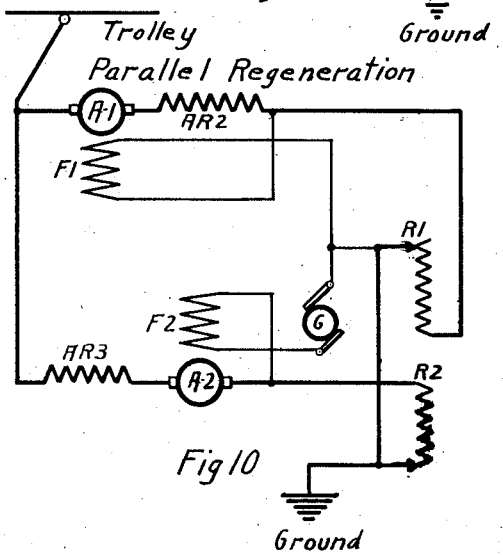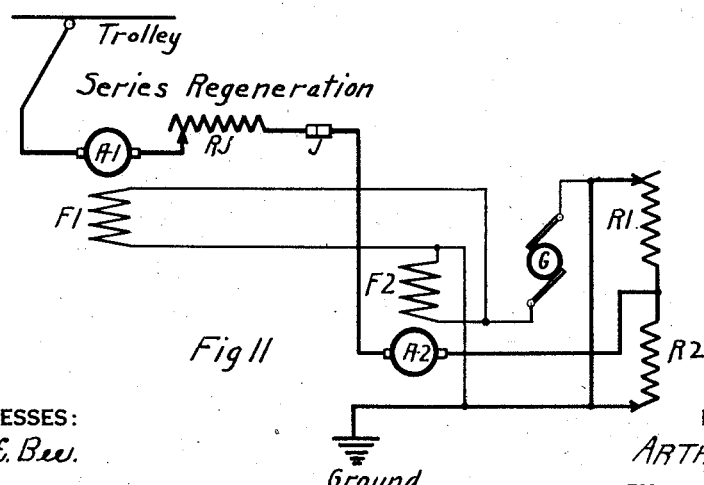

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,278,143.  Specification of Letters Patent.   Patented Sept. 10, 1918.

Application filed January 10, 1916. Serial No. 71,192.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Systems of Control, of which the following is a specification.

My invention relates to systems of control and especially to the regenerative control of electric railway motors and the like.

The object of my invention is to provide means of the above-indicated character which shall be relatively simple and inexpensive in construction and effective and reliable in operation, and which shall be dependent upon the speed or initial regenerative-voltage conditions of a plurality of dynamo-electric machines for connecting the machines in initial parallel or series relation to the supply circuit.

So far as I am aware, no automatic selective means of the above-mentioned type has heretofore been provided for immediately connecting a plurality of momentum-driven, dynamo-electric machines in proper initial relation to effect the return of energy to the supply circuit. According to my present invention, I provide various means for achieving the desired result, whereby highly efficient and reliable direct-current regenerative-control systems are secured.

Figure 1:
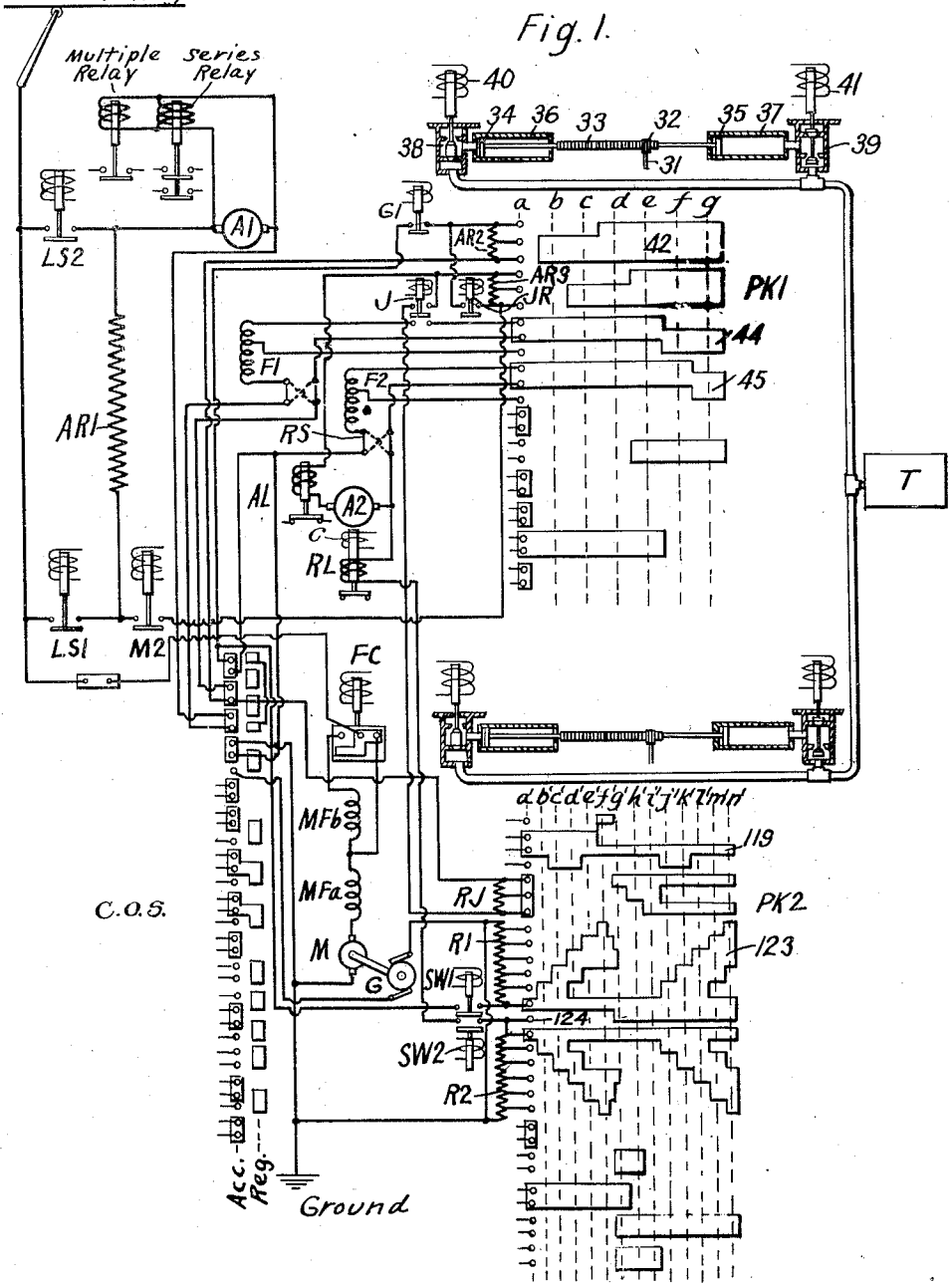
Figure 2:
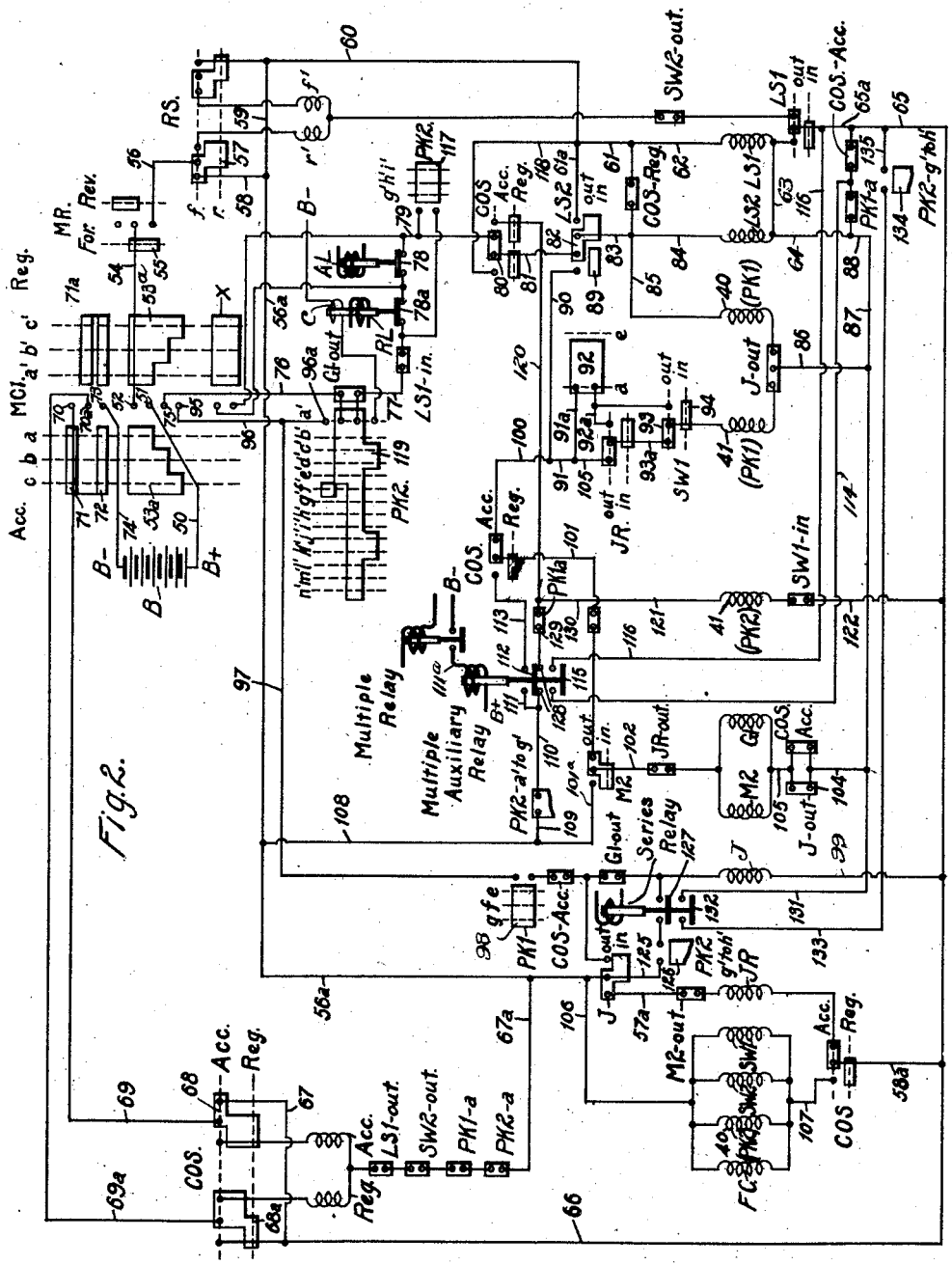
Figure 3:
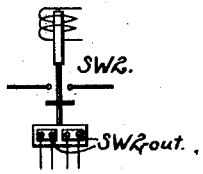
Figure 4:
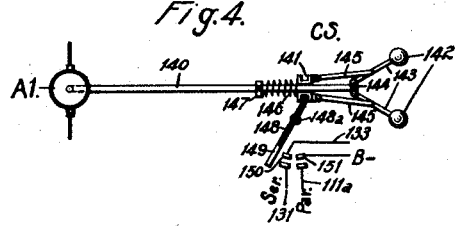
Figure 5:
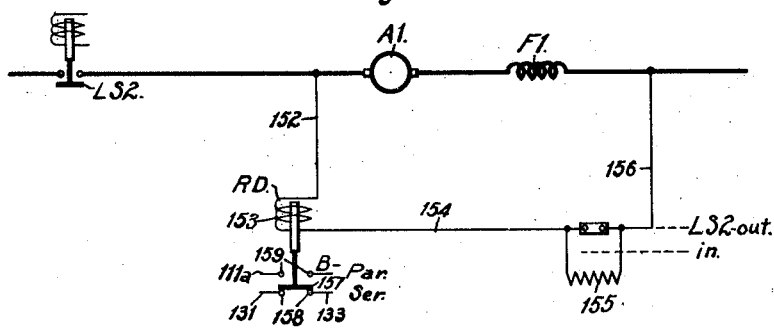
Figure 6:
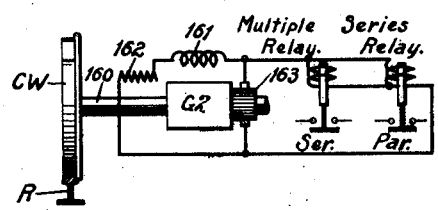

In the accompanying drawing, Figure 1 is a diagrammatic view of the main circuits of a system of control embodying my invention; Fig. 2 is a diagrammatic view of the auxiliary governing circuits for manipulating the various motor-controlling switches that are shown in Fig. 1 in accordance with a desired sequence; Fig. 3 is a detailed diagrammatic view of a complete switch that is employed in the system of Fig. 1; Fig. 4, Fig. 5 and Fig. 6 are diagrammatic views of modifications of certain portions of the systems that are illustrated in Fig. 1 and in Fig. 2; and Fig. 7 to Fig. 11, inclusive, are simplified diagrammatic views corresponding to Fig. 1 and showing the circuit connections for initial series acceleration, final parallel acceleration, preliminary to regeneration, parallel regeneration and series regeneration, respectively, as denoted by the accompanying legends.

Referring to Fig. 1, the system illustrated comprises a plurality of suitable supply-circuit conductors, trolley and ground; a plurality of main dynamo-electric machines having the armatures A1 and A2 and corresponding series-connected field magnet windings F1 and F2; a reversing switch RS of a familiar electrically-controlled drum type, which is shown conventionally here, for the purpose of reversing the electrical relations of the corresponding armatures and field windings; a plurality of accelerating resistors AR1, AR2 and AR3; a plurality of main-circuit switches LS1, LS2, M2, JR, J, G1, SW1 and SW2; a transition resistor RJ for a purpose to be described; a plurality of resistors R1 and R2 that are employed during regenerative operation of the system only; an automatically-operated controller PK1 that is adapted to occupy an off position $a$, and a plurality of operative positions $b$ to $g$, inclusive, and that is preferably of the drum type, for manipulating various circuit connections during the accelerating period of the motors; a second similar controller PK2 that is adapted to occupy an off position $a'$ and a plurality of operative positions $b'$ to $n'$, inclusive, and that is employed during regenerative operation only, chiefly in connection with the manipulation of the resistors R1 and R2; a plurality of limit switches of a familiar type AL and RL, the former being employed during acceleration of the motors and the latter being employed during regenerative operation; a change-over switch COS of the drum type that is adapted to occupy two positions respectively marked "Acc." and "Reg.", standing for acceleration and regeneration; respectively, an auxiliary motor-generator set or dynamotor that is employed during regenerative operation and comprises a motor armature winding M, a generator armature winding G and a subdivided field-magnet winding having sections MF$a$ and MF$b$ that are connected in series-circuit relation with the armature winding M; a switch FC that is employed for field control of the motor-generator; and a plurality of relays respectively marked "Series relay" and "Multiple relay" that severally have their actuating coils connected across the main armature winding A1.

The single actuating coil of the accelerating limit switch AL is connected in the main circuit intermediate the resistor AR3 and the armature A2 thereby, at all times, receiving the current that traverses the armature A2; while the regenerating limit switch RL has its series actuating coil connected intermediate the armature A2 and the resistor R2, whereby the series coil received the current of the armature winding A2 and also the current that is sent through the resistor R2 from the generator armature winding G.

The limit switch RL is placed in the circuit shown because it has been found that, if the series coil of the limit switch receives both of the currents above referred to, the rate of deceleration of the regenerating machines is much more uniform than if a limit switch placed in the position occupied by the switch AL, for example, were used. Various tests giving the torque variations of the regenerating machines with a limit switch connected in the positions respectively occupied by the switches AL and RL conclusively show that the variation in the regenerative current over the range of practical operating speed employed is relatively small in the case of the limit switch RL, as compared with the limit switch AL. The regenerating limit RL is also provided with an auxiliary or shunt-connected actuated coil, as is more fully described in connection with the auxiliary control system of Fig. 2.

It should be observed that, although the auxiliary contact members of the limit switches AL and RL are disposed in series-circuit relation, provision has been made to render only one switch operative at a time. During acceleration, the switch RL remains down since no current traverses the circuit of its actuating coil; whereas, during regeneration, the contact members 78 of the switch AL are bridged by contact segment $x$ of the master controller, and, consequently, the switch AL has no effect on the regenerative operation of the system.

The operating mechanisms of the controllers PK1 and PK2 are identical, each comprising a shaft 31 that is associated with the rotatable controller drum, and a pinion 32 that is attached to the upper end of the shaft 31 and is adapted to mesh with a suitable rack member 33 which has its respective ends provided with a plurality of piston members 34 and 35. The pistons 34 and 35 are respectively adapted to operate within suitable cylinders 36 and 37, the access of fluid pressure to which from a suitable tank or reservoir T, is governed by a plurality of suitable valve members 38 and 39, respectively. A plurality of actuating coils for the valves 38 and 39, respectively, are adapted to be energized during the operation of the system shown in Fig. 2, as more fully described later. The valve 38 is normally closed to exclude fluid pressure from the cylinder 36 but admits pressure thereto whenever the actuating coil 40 is energized; whereas the valve member 39 is normally open to admit fluid pressure to the cylinder 37 but is adapted to exhaust pressure therefrom when the actuating coil 41 is energized. In this way, fluid pressure is normally present in the cylinder 37 and is normally excluded from the cylinder 36, whereby the controller drum is biased to its off position, as indicated by the respective positions of the pistons 34 and 35.

The operation of the controller PK1 and PK2, so far as the mechanical apparatus just described is concerned, may be set forth as follows:

When both of the actuating coils 40 and 41 are simultaneously energized, fluid pressure is exhausted from the cylinder 37 and is admitted to the cylinder 36 to effect a movement of the controller drum through its various operative positions until the actuating coil 41 is deënergized, when balanced-pressure conditions exist in the two cylinders 36 and 37, whereby the controller drum is positively and rapidly brought to rest in any desired position. In the system illustrated in Fig. 2, the operation of the valve member 39 is controlled by a limit switch to automatically effect a step-by-step operation of the controller drum in accordance with the required service conditions. To return the controller drum to its off position, it is merely necessary to simultaneously deënergize both actuating coils 40 and 41, whereby fluid pressure is exhausted from the cylinder 36 and is admitted to the cylinder 37.

Reference may now be had to the auxiliary governing system that is shown in Fig. 2, which comprises the actuating coils of the various main-circuit switches and of the controllers PK1 and PK2; a master controller MC1 that is adapted to occupy a plurality of positions $a$, $b$ and $c$ in an accelerating direction and a plurality of operative positions $a'$, $b'$ and $c'$ in a regenerative direction; a master reverser MR of a familiar type that is associated in the customary manner with a pair of actuating coils $r'$ and $f'$ of the main-circuit reversing switch RS; a plurality of electrical interlocking contact members of a familiar type that are associated with, and adapted to be actuated by, the various main-circuit switches in the familiar manner that is illustrated in Fig. 3 in connection with switch SW2. Inasmuch as the use of such interlock contact members is old and is well-known to those skilled in the art, it is not deemed necessary to illustrate all of the main-circuit switches in conjunction with all of the corresponding interlocking contact members, and it is thought that the illustration of Fig. 3 will be sufficient for the purposes of the present specification.

The auxiliary governing system also comprises a suitable source of energy, such as a battery B, and a pair of actuating coils associated with the change-over switch COS and adapted to electrically control its movements to the accelerating or regenerating position, in accordance with the legends marked upon them. In addition to the "series relay" and the "multiple relay" already mentioned and which are adapted to perform circuit functions hereinafter described, a "multiple auxiliary relay" is also used in connection with the "multiple relay", having its actuating coil in series-circuit relation with the auxiliary contact members of the latter across the battery B.

Assuming that the master controller MC1 is moved to its final operative position c, the complete automatic accelerating operation of the system shown may be set forth as follows:

A circuit is first established from the positive terminal of the battery B, through conductor 50, control fingers 51 and 52, which are bridged by contact segment 53 of the master controller, conductor 54, contact segment 55 of the master reverser MR in its forward position, conductor 56, contact segment 57 of the reversing switch RS in its forward position, conductors 58, 59, 60, 61 and 62, the actuating coil of the switch LS1, conductors 63 and 64, interlock PK1—a, interlock COS—Acc., conductors 65, 66 and 67, contact member 68 of the change-over switch COS in its accelerating position, conductor 69, control finger 70, contact segments 71 and 72 and control finger 73 of the master controller, and conductor 74 to the negative terminal B— of the battery B. As soon as the switch LS1 is closed, its actuating circuit is transferred through an interlock LS1—in directly to the conductor 65 through conductor 65a.

Another circuit is simultaneously established from conductor 58, through conductor 56a, interlock J—out, conductor 57a, interlock M2—out, the actuating coil of the switch JR, interlock COS—Acc., and conductor 58a to the negative conductor 66. The motors are thus connected in series-circuit relation with the accelerating resistors AR1, AR2 and AR3 across the supply circuit (see Fig. 7). The circuit connections just described correspond to the position a of the master controller, and no further acceleration would occur were the master controller not to be moved to a subsequent position.

However, when the master controller occupies its position b or c, the automatic operation is further continued by the establishment of a circuit from the contact segment 53 of the master controller, through a control finger 75, conductor 76, interlock G1—out, conductor 77, interlock LS1—in, the auxiliary contact members 78a and 78 of the limit switches RL and AL, respectively, conductor 79, interlock 80—COS—Acc., conductor 81, interlock 82—LS2—out, conductors 83 and 84, the actuating coil of the switch LS2, conductor 63, interlock LS1—in, and conductor 65 to the negative conductor 66.

Another circuit is established at this time from conductor 83, through conductor 85, the actuating coil 40 of the controller PK1, interlock J—out, conductors 86, 87 and 88, interlock PK1—a and thence to the negative conductor 66, as already described. Moreover, provided the limit switch AL has dropped to its lower position, further circuit is established through the auxiliary contact members thereof, as already described, to the conductor 81, whence circuit is completed through interlock 89—LS2—in, conductors 90, 91 and 91a, contact member 92—PK1—a to d, conductor 92a, interlock 93—JR—in, conductor 93a, interlock 94—SW1—out and the actuating coil 41 of the controller PK1 to interlock J—out and conductor 86, as already set forth.

As soon as the switch LS2 is closed, a holding circuit for its actuating coil is formed to include interlock 82—LS2—in and conductor 61a, which is connected to the energized conductor 60.

The two actuating coils of the controller PK1, being thus simultaneously energized, the controller is actuated to its initial operative positon b to bring a contact member 42 of the controller (Fig. 1) into engagement with a plurality of control fingers that are associated with the resistor AR2, thereby short-circuiting one section thereof. As soon as the controller reaches its position b, the limit switch will have lifted, thereby temporarily preventing further operation of the controller. The controller PK1 is thus moved step-by-step, in accordance with the limit switch AL, to its position e, thereby gradually excluding the resistors AR2 and AR3 from circuit. The circuit connections at that time correspond to the position b of the master controller, or, in other words, full-series connection of the motors.

However, with the master controller occupying its position c, a circuit is next established from the contact segment 53, through control finger 95, conductors 96 and 97, contact member 98—PK1—e to g, interlock COS—Acc., interlock G1—out, the actuating coil of the switch J and conductor 99 to the negative conductor 66. The actuating coil of the switch JR and the actuating coils 40 and 41 of the controller PK1 are deënergized upon the closure of the switch J by reason of the exclusion from their control circuits of the respective interlocks J—out. The two actuating coils of the controller PK1 being thus simultaneously deënergized, the drum returns to its off-position a.

When the limit switch AL has again dropped, a further circuit is completed through its auxiliary contact members to the conductor 90, as already described, and thence through conductor 100, interlock COS—Acc., conductor 101, interlock PK1—a, interlock M2—out, conductor 102, interlock JR—out, the parallel-connected actuating coils of the switches M2 and G1, conductor 103, interlocking COS—Acc., and conductor 104 to conductor 87, whence circuit is completed as already set forth. Upon the closure of the switches M2 and G1, the circuit of their actuating coils is transferred through interlock M2—in and conductor 101a to conductor 108. The closure of the switch G1 effects the opening of the switch J by reason of the exclusion of the interlock G1—out from the energizing circuit of its actuating coil. The motors have thus been brought to the initial parallel position by means of the familiar bridging transition method, and the resistors AR2 and AR3 are again actively connected in the circuits of the respective motors.

The opening of the switch J allows the energization of the actuating coil 40 of the controller PK1 through interlock J—out, as hereinbefore described. The other actuating coil 41 of the controller PK1 is also simultaneously energized, from the conductor 91, through conductor 105, interlock JR—out and conductor 93a, as already described. The controller PK1 is thus successively actuated through its various operative positions in accordance with the limit switch AL, the energization of the actuating coil 41 being continued beyond the position e of the controller PK1 by reason of the substitution for the contact member 92 of the interlock JR—out.

When the controller PK1 reaches its position f, a contact member 44 (Fig. 1) is adapted to effect the exclusion from circuit of a portion of the main field winding F1, and a contact member 45 is adapted to perform a similar office, when the controller reaches its final operative position g, in connection with the field winding F2. The well known "field control" is thus effected to produce a further accelerating step of the motors, as will be understood. (See Fig. 8.)

The regenerative operation of the system will now be described. The general function of the relays respectively marked "Series relay", "Multiple relay" and "Multiple auxiliary relay" may first be pointed out to advantage, and the specific connections effected by them will be described later in connection with the regenerative operation. The series relay is adapted to act at a relatively low voltage, for example, 200 volts, to effect the connection of the machines in series relation across the supply circuit, provided the speed of the machine is so low that it would be impossible to effect regeneration by parallel connection of the machines. On the other hand, the multiple relay and multiple auxiliary relay in conjunction are adapted to connect the motors in initial parallel-circuit relation across the supply circuit, provided the voltage of each motor is sufficient to individually effect regenerative operation to the supply circuit. By the use of both the multiple relay and the multiple auxiliary relay in conjunction, the operation of the circuits governed by them is delayed slightly behind the operation of the circuits that are governed by the series relay whereby, in case of relatively low speeds of the momentum-driven machines, the series relay will act first to effect the series connection of the machines before the multiple relay has an opportunity to effect its circuit changes. In other words, if the multiple relays are actuated, although the series relay is of necessity also operated, the momentum-driven machines are initially connected in parallel-circuit relation; the PK2 drum is then automatically operated, in accordance with the limit switch RL, to effect a gradual short-circuit of the resistors R1 and R2 as the machine speeds decrease; the machines are then automatically changed over to series-circuit relation, with the resistors R1 and R2 initially in circuit; and these resistors are then again gradually short-circuited as the speeds of the machines still further decrease. However, in case conditions are such that parallel regenerative operation of the machines is impracticable, the series relay alone acts, whereby the control drum PK2 is immediately moved through positions that correspond to parallel operation of the machines to the initial position that corresponds to the series relation thereof, and the remaining operation of the system is the same as before.

Assuming that speed conditions are suitable for parallel regenerative operation of the machines and that the controllers PK1 and PK2 occupy the illustrated positions, the master controller MC may be first moved to its final operative position c', whereby a circuit is first established from the positive terminal of the battery B, through the master controller in its position c' and the master reverser in its forward position, and to the conductor 56a, as described in connection with acceleration, and thence, through conductor 67a, interlocks PK2—a, PK1—a, SW2—out and LS1—out, the actuating coil of the change-over switch COS that corresponds to regenerative operation, contact segment 68a of the change-over switch in its accelerating position, conductor 69a, control fingers 70a and 73, which are bridged by contact segment 71a of the master controller, and thus to the negative terminal of the battery B. The change-over switch COS is thus actuated to its position corresponding to regenerative operation wherein the circuit just described is broken at the contact segment 68a.

Another circuit is then established from conductor 56a, through conductor 106, the parallel-connected actuating coils of the switches FC, SW2 and SW1 and the actuating coil 40 of the controller PK2, conductor 107, interlock COS—Reg., conductors 58a and 66 and the contact member 68a of the change-over switch to the battery B, as already described.

The closure of the switch FC effects the inclusion of the field-magnet winding MFb of the motor-generator or dynamotor in the circuit thereof. It will be understood that this motor-generator or dynamotor may be employed during acceleration of the main motors for the purpose of supplying energy to the various auxiliaries employed upon the car, such as the lighting and the control system, if desired, and may also be used to mechanically drive an air-compressor, in accordance with familiar practice. However, in such a case, it has been found to be of advantage to increase the field excitation of the motor-generator or dynamotor during regenerative operation of the main machines, and this increased excitation is obtained by the closure of the switch FC as just described.

The closure of the switches SW1 and SW2 effects the connection of the generator-armature winding G through the resistors R1 and R2, respectively, to the field magnet windings F1 and F2, as simply illustrated in Fig. 9.

Another circuit is simultaneously established from conductor 56a, through conductors 108 and 109, contact member PK2—a' to g', conductors 110 and 111, the auxiliary contact members 112 of the multiple auxiliary relay in its upper position, the actuating coil of which has been energized through the closure of the multiple relay and conductors B+, 111a and B—, and circuit is continued through conductor 113, interlocks COS—Reg., conductor 101, thence through the actuating coils of the switches M2 and G1, as already set forth, conductor 103, interlock J—out and conductor 104 to the negative-circuit conductor 66, as hereinbefore described.

A further circuit is established from the master controller, through the actuating coil of the switch LS1, as set forth in connection with the acceleration of the motors, to the interlock PK1—a, whence its circuit is completed through conductor 114, the auxiliary contact members 115 of the multiple auxiliary relay in its upper position, conductor 116 and conductor 65a to the negative conductor 66. The momentum-driven machines at this time are thus connected in the manner shown in Fig. 10.

Another circuit is simultaneously established from the conductor 60, through conductor 118, interlock COS—Reg., conductor 81 and the interlock 82—LS2—out to the actuating coil of the switch LS2 and thence, through the interlock PK1—a, as alreay described in connection with the switch LS1. The circuit connections just described correspond to the position a' of the master controller, and no further regenerative operation would occur if the master controller were not moved to one of its subsequent positions.

Provided that the limit switch RL has dropped to its lower position, circuit is next established from contact segment 53a of the master controller in position b' or c', through control finger 75, conductor 76, contact member 119 of the controller PK2 in its off position a', conductor 77, interlock LS1—in, the auxiliary contact members 78a of the limit switch RL, contact segment x of the master controller, conductor 79, interlock COS—Reg., conductors 120 and 121, the actuating coils 41 of the PK2 controller, interlock SW1—in and conductor 122 to the negative conductor 66. Both actuating coils of the PK2 controller being thus simultaneously energized, a step-by-step movement of the controller, in accordance with the operation of the limit switch RL, will occur.

The circuit disposition of the series actuating coil of the limit switch RL has already been described and its purpose pointed out. As a further means of obtaining a desirably constant regenerated current, the limit switch RL is provided with an auxiliary battery-energized actuating coil c that is brought into operation in various positions of the controller PK2 to vary the setting of the switch and thus aid in producing a substantial equalization of the torques of the several machines and of the regenerated currents throughout the regenerating period. For example, it will be observed that the coil c is connected in circuit in positions c', d' and j' and k' of the controller PK2, but is inoperative at other times.

The controller PK2 is actuated, in a step-by-step manner already described, to the position f' which corresponds to full-parallel relation of the regenerating machines and to the position b' of the master controller, the resistors R1 and R2 having been gradually short-circuited, as the controller moved in accordance with the operation of the limit switch RL, to maintain a substantially constant regenerated current, as will be understood. Provided the master controller occupies its position $c'$, the energization of the actuating coil 41—(PK2) is maintained until the switch G1 opens and the interlock G1—out thus becomes operative, through contact segment 53a, control finger 95, conductor 96, control finger 96a, and contact segment 119.

As soon as the controller PK2 occupies its position $g'$ the short-circuits of the resistors R1 and R2 are removed. Also a control circuit is established from the conductor 56a, through conductor 125, contact member 126—PK2—$g'$ and $h'$, auxiliary contact members 127 of the series relay in its upper position, the actuating coil of the switch J and conductor 99 to the negative conductor 66.

In order to prevent a path of relatively low resistance being connected across the supply circuit by the closure of the switch J at the time that the other switches, already mentioned, are closed, the transition resistor RJ is employed in series-circuit relation with the switch J. As illustrated in Fig. 1, when the controller PK2 occupies its position $g'$, the entire resistor RJ is connected in circuit and, in the two succeeding positions $h'$ and $i'$, the resistor is gradually short-circuited, the switches M2 and G1 having been opened immediately upon the closure of the switch J by reason of the exclusion of the interlock J—out from the control circuit of the actuating coils. When these switches have been opened, there is no longer any danger of a short-circuit connection, and, consequently, the resistor RJ may be excluded from circuit.

Moreover, upon the occupation of position $g'$ by the controller PK2, contact segment 123 thereof (Fig. 1) engages control finger 124, whereby the hitherto separated ends of the resistors R1 and R2 are connected to dispose the resistors in parallel-circuit relation, it being found that a lesser variable circuit resistance is desirable during series regeneration.

At this time, therefore, the regenerating machines are connected in series-circuit relation, with the parallel-connected resistors R1 and R2 actively in circuit. (See Fig. 11.) The further step-by-step automatic actuation of the controller PK2 again effects the gradual short-circuit of the resistors R1 and R2 to maintain a substantially contact regenerated current to a relatively low vehicle speed.

Assuming, now, that the speed of the momentum-driven motors is unsuitable for setting up parallel regenerative operation, but that the initial voltage induced in the armatures of the machines through the energization of their field by the generator armature winding G is equal to 200 volts or any other predetermined value that is suitable for series regeneration, the operation of the system, upon the actuation of the master controller to its position $c'$, may be set forth as follows:

The switches FC, SW2 and SW1 are closed and the actuating coil 40 of the controller PK2 is energized, as already related in connection with the multiple regeneration of the machines. Simultaneously, another circuit is established from conductor 108, through conductor 109, contact member PK2—$a'$ to $g'$, conductor 110, auxiliary contact members 128 of the multiple auxiliary relay in its lower position, conductor 129, interlock PK1—$a$ and conductors 130 and 121 to the actuating coil 41 of the controller PK2.

The energization of the coil 41 is thus independent of the operation of the limit switch RL, and the controller PK2 is rapidly moved to its position $h'$, whereby the circuit is broken at the interlock PK2—$a'$ to $g'$. However, the energization of the actuating coil 41—(PK2) is maintained as far as position $j'$ by reason of the bridging of the auxiliary contact members 78a of the limit switch RL by a contact member 117—PK2—$g'$ to $i'$, the circuit being otherwise as already described in connection with multiple regeneration. The switches M2 and G1 are prevented from closing by reason of the exclusion of the auxiliary contact members 112 of the multiple auxiliary relay from the circuit of their actuating coils.

At the same time, the actuating coils of the switch LS1 is energized from the master controller, in the manner already related, to the conductor 64, whence circuit is now completed through conductors 88 and 131, auxiliary contact members 132 of the series relay in its upper position, conductor 133, contact member 134—PK2—$g'$ to $n'$, and conductor 135 to the negative conductor 66. The switch LS2 is then closed, as soon as the limit switch RL has dropped to its lower position, through the circuit already traced in connection with the multiple regeneration of the machines. The switch J is also brought in as soon as the PK2 controller occupies the position $g'$, in the manner already described in connection with the transition of the machines from parallel to series relation. The energizing circuit of the actuating coil 41 of the PK2 controller is then transferred through the auxiliary contact members 78a of the limit switch RL, as hereinbefore described, and the PK2 controller, from that time on, is actuated in accordance with the operation of the limit switch RL, and in exactly the same manner as that set forth in connection with the latter or series portion of the regenerative operation hereinbefore described.

It will be observed that one of the most advantageous features of the automatic system just described is the combination of means for inherently imparting to the regenerating machines a negative compound characteristic and limit-switch controlled means for varying the field excitation of the machine as their speed decreases to maintain a substantially constant regenerated current. By the term "negative compound characteristic," is meant an inherent tendency of the system to effect a decrease of main-field-winding excitation upon an incipient increase of regenerated current and vice versa. The advantages of the negative compound characteristic that is provided in the system, such as the instantaneous regulating action and the elimination of relay-controlled or other devices, such as have been used in the prior art, are evident.

The remaining novel and patentable features of the regenerative control system hereinbefore described are set forth and claimed in a co-pending application of R. E. Hellmund, Serial No. 44,443, filed August 9, 1915, and assigned to the Westinghouse Electric & Manufacturing Company.

Reference may now be had to Fig. 4, wherein the portion of the system shown comprises the armature A1 and a centrifugally-operated switch CS which is adapted to perform the same functions as the three relays, series relay, multiple relay and multiple auxiliary relay that have already been shown and described.

The centrifugal switch CS is shown as associated with an extension 140 of the shaft of the armature A1, whereby the rotatable parts of the switch rotate at the same speed as the armature. However, it will be understood that any other suitable mechanical connections of the centrifugal switch, whereby a speed proportional to the speed of the regenerating armatures is obtained, may be employed.

The centrifugal switch CS may comprise a suitable sleeve member 141 that is adapted to slide along the shaft member 140; a plurality of weights or balls 142 that are associated by means of links 143 with a collar member 144 that is rigidly associated with the end of the shaft 140; and a plurality of connecting members 145 that have their respective ends associated with the movable sleeve member 141 and the respective link members 143. The centrifugal switch is biased to a predetermined position through the agency of a suitable helical spring 146, the ends of which bear against the movable sleeve member 141 and a fixed collar member 147.

The centrifugal switch CS is thus of the familiar fly-ball-governor type that is adapted to operate in such manner that, during the high-speed operation of the shaft 140, the sleeve member 141 is drawn toward the left, when the armature A1 is at rest, the switch occupies the position illustrated, and, when the shaft rotates at an intermediate speed, the switch occupies a corresponding intermediate position.

A switch arm 148 of insulating material is pivotally mounted at an intermediate point 148a and has one end associated with and adapted to be freely moved by the movable sleeve member 141, while the other end is provided with a suitable contact member 149 for bridging one of two pairs of stationary contact members 150 and 151, respectively, corresponding to series and parallel regeneration. The contact members 150 are respectively connected to conductors 131 and 133, while the contact members 151 are respectively connected to conductors 111a and B—.

Consequently, the bridging of the stationary contact members 150 by the movable contact member 149 effects the initial series connection of the regenerative dynamo-electric machines, while the interconnection of the contact member 151 by the movement of the contact member 149 under relatively high-speed conditions effects the initial parallel connection of the main machines. Thus, dependent upon the initial coasting speed of the regenerative machines, the centrifugal switch CS is operated either to its initial position or through that position to its second position, whereby the same functions are performed as were accomplished by the series relay and multiple relay that are shown in Fig. 2. Inasmuch as the operation of the remainder of the regenerative control system is, or may be, identical with that already set forth, it is not believed that any further exposition of the relation of the centrifugal switch CS to the system is necessary.

In Fig. 5, the portion of the system illustrated comprises the armature A1 and the field-magnet winding F1, the supply-circuit-connecting or line switch LS2, and a relay device RD.

The energizing circuit of the relay device RD is established during acceleration of the main motors from one terminal of the armature A1 through conductor 152, the actuating coil 153 of the relay device, conductor 154, an auxiliary resistor 155 which is adapted to be short-circuited by an interlock LS2—out when the line switch LS2 occupies its open position, conductor 156, and the field winding F1 to the opposite terminal of the armature A1. The actuating coil 153 of the relay device is thus connected across one of the main electric motors with the resistor 155 in the circuit during the motor acceleration, and is thereby actuated, under high-speed conditions, to its upper position which corresponds to parallel-regenerative connection of the main-dynamo-electric machines, while its lower or normal position corresponds to the initial series connection of the regenerative machines. However, no circuits are energized by the action of the relay device during acceleration of the machines, inasmuch as the associated control circuits are open in the master controller MC.

The movable or bridging contact member 157 of the relay device RD is adapted to connect conductors 131 and 133 through stationary contact members 158 in the lower position of the relay device, and is adapted to bridge a pair of stationary contact members 159 that are respectively connected to conductors 111a and B− when the relay device occupies its upper position. Consequently, the occupation of the one or the other position of the relay device RD during initial regenerative conditions, serves to connect the momentum-driven dynamo-electric machines in either parallel or series relation, dependent upon the voltage conditions of the armature A1 at the time.

As stated above, the relay device RD is actuated to its upper position during high-speed acceleration, whereby the stationary contact members 159 are bridged by the movable contact member 157 when the master controller is reutrned to its off position. Provided the speed of the momentum-driven machines is sufficiently high to permit of satisfactory parallel regeneration of the machines, the residual voltage of the armature A1 will be sufficient to maintain the relay device in its upper position, inasmuch as the series auxiliary resistor 155 has been short-circuited by the opening of the line switch LS2 upon the return of the master controller to its off position, and thus, the entire residual voltage of the motor in question is impressed upon the actuating coil 153 of the relay device. However, in case the master controller is returned to its off position when the accelerating motors are in series relation or if the speed of the coasting machines has been allowed to decrease to a corresponding value, then the residual voltage of the armature A1 is insufficient to maintain the relay device RD in its upper position, and the resultant bridging of the stationary contact members 158 by the movable contact member 157 effects the initial series regenerative connection of the coasting machines. In this way, the single relay device RD performs the same functions as the series relay and the multiple relay that are hereinbefore described.

In Fig. 6, an alternative selective system is illustrated comprising a small commutator-type generator G2 that is illustrated as mounted upon a truck axle 160 to each end of which is secured a car wheel CW that is adapted to run upon a rail R, in accordance with the usual practice. The generator G2 thus has a speed that is proportional to the speed of the momentum-driven main dynamo-electric machines. If desired, of course, the generator G2 may be mounted directly upon the shaft of one of the main machines. In either case, the generator G2 supplies a voltage that is substantially proportional to the initial regenerative speed of the main dynamo-electric machines. The generator may be provided with a suitable shunt field-magnet winding 161 that is connected through a variable resistor 162 across the commutator cylinder 163 of the generator, or any other suitable type of field excitation may be employed.

The multiple relay and the series relay as illustrated in Fig. 1, have their actuating coils connected directly across the armature terminals of the generator G2, whereas, in the system that is illustrated in Fig. 1, the actuating coils of the relays are connected across the terminals of one of the main dynamo-electric machines A1. The general operation of the multiple relay and the series relay is identical with that already described in connection with the system that is shown in Fig. 1, and no further exposition thereof is deemed necessary.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with a supply circuit, and a plurality of dynamo-electric machines adapted for regenerative operation, of automatic means for selectively grouping said machines under predetermined conditions to permit proper connection thereof to the supply circuit.

2. In a system of control, the combination with a supply circuit and a plurality of dynamo-electric machines, of means dependent upon predetermined machine voltage conditions for selectively grouping the machines in accordance with the relation of such conditions to the supply circuit.

3. In a system of control, the combination with a supply circuit and a plurality of dynamo-electric machines, of means dependent upon the speed of the machines for selectively grouping them in accordance with the relation of machine voltage conditions corresponding to said speed to supply-circuit voltage conditions.

4. In a system of regenerative control, the combination with a supply circuit and a plurality of momentum-driven dynamo-electric machines, of means dependent upon the speed of the machines for selectively grouping said machines in such manner that the voltage of each group approximately equals the supply-circuit voltage.

5. In a system of regenerative control, the combination with a supply circuit, and a plurality of momentum-driven dynamo-electric machines, of means dependent upon initial regenerative speed and consequent voltage conditions of the machines for effecting connection thereof to the supply circuit in parallel or in series relation.

6. In a system of regenerative control, the combination with a supply circuit, and a plurality of momentum-driven dynamo-electric machines, of means for automatically effecting connection of said machines to said supply circuit in parallel relation under relatively high-speed conditions when each machine voltage approximates the supply-circuit voltage and for effecting connection of said machines to said supply circuit in series relation under relatively low-speed conditions when the combined machine voltages approximate the supply-circuit voltage.

7. In a system of regenerative control, the combination with a supply-circuit, and a plurality of momentum-driven dynamo-electric machines, of electro-responsive means for connecting the machines in parallel relation when conditions are suitable for parallel-connected regeneration thereof and for connecting the machines in series relation when conditions are suitable for series-connected regeneration thereof.

8. In a system of regenerative control, the combination with a supply circuit, and a plurality of momentum-driven dynamo-electric machines severally having armatures and field-magnet windings, of a plurality of relay devices severally having actuating coils connected across one of said armatures, said devices being both adapted to close and thereby effect initial parallel connection of said machines under predetermined relatively high regenerated voltage conditions thereof, and only one of said devices being adapted to close and thereby effect initial series connection of said machines under predetermined relatively low regenerated voltage conditions thereof.

9. In a system of regenerative control, the combination with a supply circuit, and a plurality of momentum-driven dynamo-electric machines severally having armatures and field-magnet windings, of a plurality of motor-controlling switches, a multi-position controller having successive groups of positions that respectively correspond to parallel and series machine connection for varying the field-winding circuit resistance during regenerative operation, and a pair of relay devices severally having actuating coils connected across one of said armatures, said devices being both adapted to close and thereby effect the closure of certain of said switches to initially dispose the machines in parallel relation under suitably high regenerated voltage conditions thereof, and only one of said devices being adapted to close under relatively low regenerated armature voltage conditions to effect the closure of certain switches to initially dispose the machines in series relation, the closure of said last switches being also dependent upon the open condition of the other relay device and upon the attainment of the initial series-corresponding position of said controller.

10. In a system of regenerative control, the combination with a supply circuit, and a plurality of momentum-driven dynamo-electric machines severally having armatures and field-magnet windings, of a plurality of motor-controlling switches, a multi-position controller having successive groups of positions that respectively correspond to parallel and series machine connection for varying the field-winding circuit resistance during regenerative operation, means responsive to main-circuit current conditions for normally actuating said controller step-by-step, a pair of relay devices severally having actuating coils connected across one of said armatures, said devices being both adapted to close and thereby effect the closure of certain of said switches to initially dispose the machines in parallel relation under suitably high regenerated voltage conditions thereof, and only one of said devices being adapted to close under relatively low regenerated armature voltage conditions to effect the closure of certain switches to initially dispose the machines in series relation, the closure of said last switches being also dependent upon the open condition of the second relay device and upon the attainment of the initial series-corresponding position of said controller, and means associated with said second relay device for arresting the field-regulating movement of said controller toward said initial series-corresponding position and for rendering the controller dependent upon said responsive means upon actuation of said second relay device to its closed position at any time during the said field-regulating movements of the controller.

In testimony whereof, I have hereunto subscribed my name this 31st day of Dec. 1915.

ARTHUR J. HALL.